United States Patent
Mardjono et al.

(10) Patent No.: US 11,667,084 B2
(45) Date of Patent: Jun. 6, 2023

(54) METHOD FOR PRODUCING AN ORDERED ARRAY OF INTERCONNECTED ACOUSTIC MICROCHANNELS

(71) Applicant: SAFRAN AIRCRAFT ENGINES, Paris (FR)

(72) Inventors: Jacky Novi Mardjono, Moissy-Cramayel (FR); Arnaud Dubourg, Montreal (CA); Edith-Roland Fotsing, Montreal (CA); Annie Ross, Montreal (CA)

(73) Assignee: SAFRAN AIRCRAFT ENGINES, Paris (FR)

( * ) Notice: Subject to any disclaimer, the term of this patent is extended or adjusted under 35 U.S.C. 154(b) by 303 days.

(21) Appl. No.: 16/770,335

(22) PCT Filed: Dec. 6, 2018

(86) PCT No.: PCT/FR2018/053135
§ 371 (c)(1),
(2) Date: Jun. 5, 2020

(87) PCT Pub. No.: WO2019/110940
PCT Pub. Date: Jun. 13, 2019

(65) Prior Publication Data
US 2020/0384695 A1 Dec. 10, 2020

(30) Foreign Application Priority Data
Dec. 6, 2017 (CA) .................................. CA 2988222
Dec. 6, 2017 (FR) ...................................... 17 61710

(51) Int. Cl.
*B29C 64/00* (2017.01)
*B29C 64/40* (2017.01)
(Continued)

(52) U.S. Cl.
CPC .............. *B29C 64/40* (2017.08); *B33Y 10/00* (2014.12); *B33Y 40/00* (2014.12); *B33Y 80/00* (2014.12);
(Continued)

(58) Field of Classification Search
CPC ................................ B29C 64/40; B33Y 10/00
See application file for complete search history.

(56) References Cited

U.S. PATENT DOCUMENTS

2004/0226620 A1* 11/2004 Therriault ......... B01L 3/502746
137/825
2007/0172588 A1   7/2007 Therriault et al.
(Continued)

FOREIGN PATENT DOCUMENTS

EP    2 996 110 A1   3/2016
FR    2 953 058 A1   5/2011

*Primary Examiner* — Nicholas R Krasnow
(74) *Attorney, Agent, or Firm* — Oblon, McClelland, Maier & Neustadt, L.L.P.

(57) ABSTRACT

A manufacturing method of an acoustic coating in an ordered array of interconnected micro-channels intended to receive, on a reception surface, an incident acoustic wave with direction Ac normal to this surface, the method including depositing a sacrificial material on a substrate surface to form a three-dimensional scaffold of filaments, infiltrating at least one part of the three-dimensional scaffold with a thermosetting material, solidifying the thermosetting material to form a solidified material, and removing the sacrificial material from the solidified material to form the ordered array of interconnected micro-channels, the filaments forming by superimposed layers the three-dimensional scaffold being, for a given layer of filaments, oriented in a direction forming, in a plane formed by the layer, a first angle θ relative to the direction Ac of the incident acoustic wave, to confer acoustic properties to the ordered array of interconnected micro-channels and thus form the acoustic coating.

8 Claims, 2 Drawing Sheets

(51) Int. Cl.
  *B33Y 10/00* (2015.01)
  *B33Y 80/00* (2015.01)
  *C08J 9/26* (2006.01)
  *F02C 7/24* (2006.01)
  *G10K 11/162* (2006.01)
  *B33Y 40/00* (2020.01)
  *B29K 91/00* (2006.01)
  *B29K 101/10* (2006.01)
  *B29L 31/00* (2006.01)

(52) U.S. Cl.
  CPC .................................. *C08J 9/26* (2013.01); *F02C 7/24* (2013.01); *G10K 11/162* (2013.01); *B29K 2091/00* (2013.01); *B29K 2101/10* (2013.01); *B29K 2995/0002* (2013.01); *B29L 2031/7504* (2013.01); *F05D 2260/96* (2013.01)

(56) References Cited

U.S. PATENT DOCUMENTS

| | | |
|---|---|---|
| 2009/0000678 A1 | 1/2009 | Therriault et al. |
| 2012/0228051 A1* | 9/2012 | Drevon ............... G10K 11/172 156/292 |
| 2016/0076400 A1 | 3/2016 | Weir |

* cited by examiner

METHOD FOR PRODUCING AN ORDERED ARRAY OF INTERCONNECTED ACOUSTIC MICROCHANNELS

BACKGROUND OF THE INVENTION

The present invention relates to the general field of the manufacture of parts of polymer materials, particularly thermosetting, by additive manufacturing, and it relates more particularly, but not exclusively, to the manufacture of an acoustic wall coating of a turbomachine such as an airplane turbojet.

The control of noise nuisances due to airplanes in the vicinity of airports has become a public health challenge. Ever more severe standards and regulations are imposed on airplane manufacturers and on airport managers. Consequently, constructing a silent airplane has become a powerful selling point over the years. At present, the noise generated by airplane motors is attenuated by localized reaction acoustic coatings which allow reducing the sound intensity of the engine over one or two octaves, based on the principle of Helmholtz resonators. These coatings appear conventionally in the form of composite panels consisting of a rigid plate associated with a honeycomb core covered with a perforated skin. However, in new engine generations (for example in turbofan engines), the zones available for acoustic coatings are caused to be substantially reduced, as in the UHBR (ultra-high bypass ratio) technology.

It is therefore important to propose new methods and/or new materials, particularly porous materials) allowing eliminating or significantly reducing the level of noise produced generated by airplane engines, especially during takeoff and landing phases, and over a larger frequency range than currently, including the low frequencies while still retaining the performance of the engine. That is the reason for which new noise reduction technologies are currently being sought, this with minimal impact on the other functionalities of the engine such as specific fuel consumption, which constitutes an important commercial advantage.

Moreover, it is customary today and advantageous to have recourse to additive manufacturing processes in place of traditional foundry, forging and machining methods, to easily, rapidly and at lower cost produce three-dimensional complex parts. The aeronautical field lends itself particularly well to the use of these methods. Among them can be cited in particular the method of wire beam deposition described in application US2004/0226620.

OBJECT AND SUMMARY OF THE INVENTION

The present invention therefore has as its object a method of forming a new material, which can significantly reduce the noise generated by airplane turbojets over a large range of frequencies extending from low to high frequencies. The acoustic coatings originating with this method are intended to be mounted on a wall of a turbomachine in contact with a fluid flow, and more particularly a fan casing.

To this end, a manufacturing method of an acoustic coating in an ordered array of interconnected micro-channels is proposed, intended to receive, on a reception surface, an incident acoustic wave with direction Ac normal to this surface, the method consisting in:

depositing a sacrificial material on a substrate surface to form a three-dimensional scaffold of filaments,
infiltrating at least one part of said three-dimensional scaffold with a thermosetting material,
solidifying said thermosetting material to form a solidified material, and
removing said sacrificial material from said solidified material to form an ordered array of interconnected micro-channels, characterized in that, to confer acoustic properties to said ordered array of interconnected micro-channels and thus form said acoustic coating, said filaments forming by superimposed layers said three-dimensional scaffold are, for a given layer of filaments, oriented in a direction forming, in a plane formed by said layer, a first predetermined angle θ relative to the direction Ac of said incident acoustic wave.

Thus a porous microstructure is obtained with regular and ordered porosity which insures considerable absorption of the acoustic waves by visco-thermal dissipation within the micro-channels.

Preferably, said filaments have a different diameter or cross-section width depending on their orientation direction in said three-dimensional scaffold.

According to one particular configuration, said superimposed layers forming said three-dimensional scaffold include filaments oriented, for some, according to a first angle θ and, for others, according to a second angle −θ, a layer of filaments oriented according to said first angle θ following a layer of filaments oriented according to a first angle −θ.

Advantageously, said predetermined angle is comprised between 25° and 40°, typically 32°.

Preferably, the fill rate of said three-dimensional scaffold is at least 70%.

Advantageously, said sacrificial material is an organic ink or a natural wax.

Preferably, said thermosetting material is a polymer resin and advantageously a photo-polymerizing resin.

Advantageously, the diameter or the cross-section width of the filaments is less than 250 microns.

The invention also relates to the acoustic turbomachine wall coating obtained from the aforementioned method.

BRIEF DESCRIPTION OF THE DRAWINGS

Other features and advantages of the present invention will be revealed by the detailed description given below, with reference to the following figures free of any limiting character and in which.

DETAILED DESCRIPTION OF THE INVENTION

Figure 1A:
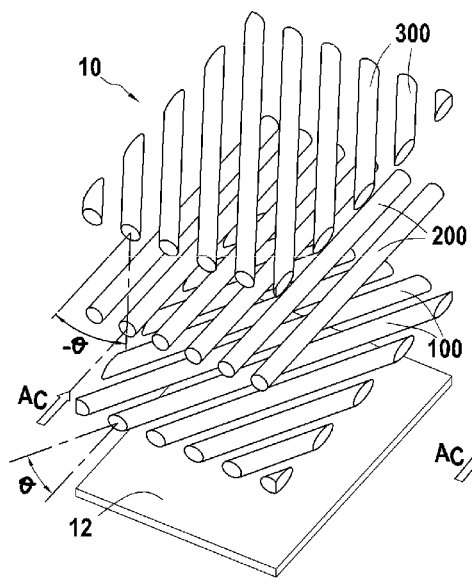
FIG. 1A illustrates, in exploded perspective, a first example of assembly of a three-dimensional scaffold of filaments conforming with the invention.

FIG. 1A illustrates in exploded perspective one part of a three-dimensional scaffold 10 of filaments 100, 200, 300, advantageously cylindrical, of a sacrificial material allowing, in conformity with the invention, the production of an ordered array of interconnected acoustic micro-channels of a nature to confer acoustic properties to a wall intended to receive on one reception surface an incident acoustic wave with direction Ac normal to this surface. This wall is preferably, without this being limiting, a wall of a turbomachine such as an airplane turbojet.

The manufacturing of an ordered array of interconnected micro-channels is carried out by additive manufacturing using the method described in the application cited in the preamble and to which it is advisable to refer for ampler details. This method allows depositing, by means of a suitable print head, cylindrical filaments of a sacrificial material with diameters of less than 1000 µm along a path specified by the user. By gravity pouring, the three-dimensional scaffold of sacrificial material is then impregnated with a thermosetting material. Once the thermosetting material is solidified, the product obtained is heated to a temperature greater than the melting temperature (typically greater than 60°) of the sacrificial material to cause it to melt and thus reveal the ordered array of micro-channels, with the size and the shape of the cylindrical filaments of the sacrificial material in the solidified material obtained. Interconnections between the micro-channels exist regularly at the points of contact between the filaments during superposition of the different layers of the sacrificial material intended to generate these micro-channels. In the final analysis, therefore, it is a mold produced by additive manufacturing.

In conformity with the invention, to confer acoustic properties to the ordered array of interconnected micro-channels obtained by this method, the filaments 100, 200, 300 which form the three-dimensional scaffold 10 by superimposed layers are oriented, during their successive deposition on a substrate 12 and at a given layer, according to an orientation direction forming in space (the two straight lines not being coplanar but located in parallel planes) a predetermined angle θ relative to the direction Ac of the incident acoustic wave impacting perpendicularly the reception surface. Thus, a first layer of filaments 100 having a direction inclined on the order of 30° (typically 32°) relative to this direction of the acoustic wave is followed by a second layer 200 having an inclination on the order of 0° (hence a direction assumed to be parallel to the incident acoustic wave Ac) then a third layer 300 having a direction inclined typically by −32° (the same value as the initial inclination, but with the opposite sign) relative to the direction of the incident acoustic wave. The deposit of the following superimposed layers continues until the deposition of the last layer, in the same succession of layers of filaments 100, 200, 300 and therefore the same different orientations.

The aforementioned angle of inclination of 32° is not intended to be limiting, and the inventors have been able to observe that an angle θ comprised between 25° and 40° would allow obtaining satisfactory acoustic properties.

Figure 1B:
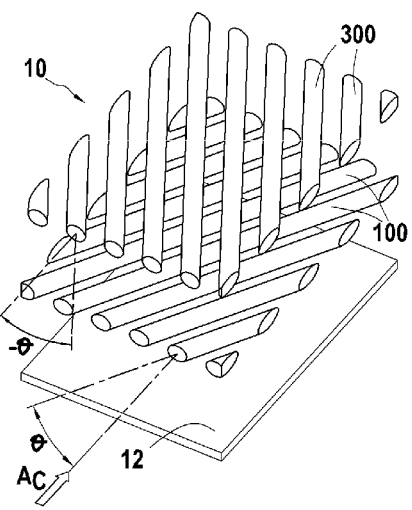
FIG. 1B illustrates in exploded perspective a second example of assembly of a three-dimensional scaffold of filaments conforming with the invention.

Likewise, FIG. 1B illustrates a different three-dimensional scaffold of filaments in which a layer of filaments 100 oriented in the horizontal plane formed by this layer at an angle on the order of 30° relative to the direction Ac of the incident acoustic wave is followed by a layer of filaments 300 oriented according to an opposite angle on the order of −30° relative to the same direction Ac of the incident acoustic wave.

It can be noted that if the filaments, when they are cylindrical, advantageously have the same diameter, a different diameter depending on the orientation direction in the three-dimensional scaffold can however be considered. The same is true when these filaments have a non-circular, elliptical for example, cross section.

Figure 2:
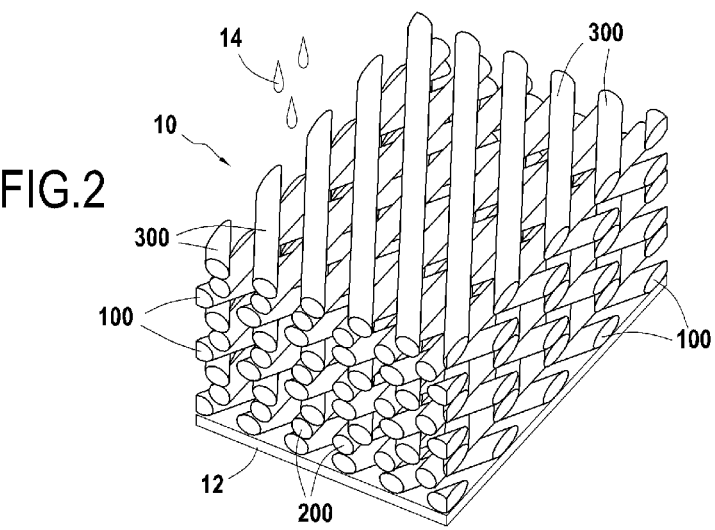
FIG. 2 is a view of the three-dimensional scaffold of FIG. 1 once assembled.

FIG. 2 shows the three-dimensional scaffold 10 obtained once the superimposed layers of filaments deposited successively from the substrate 12 and which will be impregnated with thermosetting material 14. The diameter or the width of the cross section of the filaments is preferably selected less than 250 microns and the fill rate of the three-dimensional scaffold is selected so that it is at least 70%.

Figure 3:
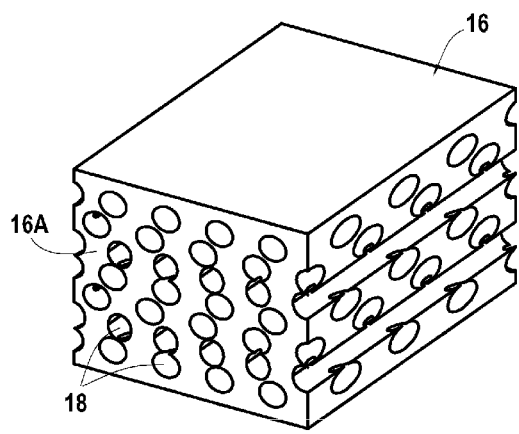
FIG. 3 is a view of the ordered array of interconnected acoustic micro-channels obtained from the three-dimensional scaffold of FIG. 2.
Figure 4:
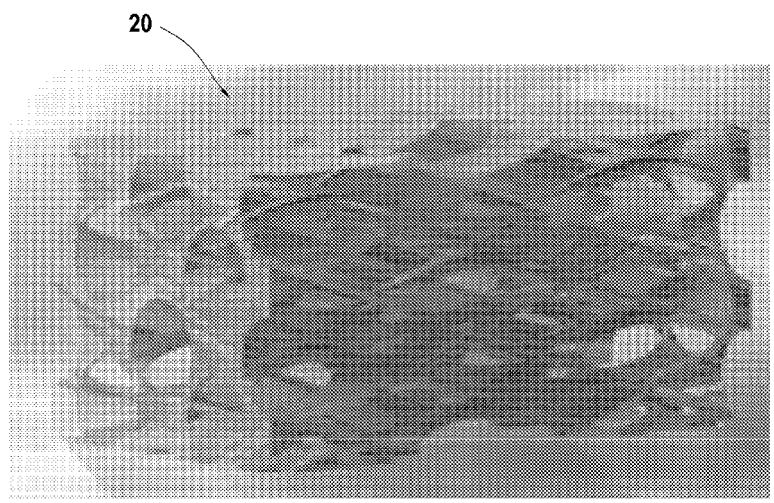
FIG. 4 shows an example of an acoustic coating including the array of FIG. 3.

The final structure illustrated in FIG. 3 after removal of the sacrificial material (an actual example of a turbomachine wall acoustic coating 20 obtained by the method of the invention is illustrated in FIG. 4) therefore has interconnected micro-channels of constant cross section (This interconnection resulting, as previously stated from the points of contact between the sacrificial filaments) which form a porous array 18 within which the acoustic wave will be able to propagate and attenuate by interacting with the rigid skeleton 16 formed by the thermosetting material. The microstructure is directly controlled by the printing of the sacrificial material by additive manufacturing. The rigid skeleton, for its part, allow giving greatly superior mechanical strength properties to those encountered for example with current stochastic foams available commercially as acoustic coatings. Moreover, the rigid skeleton being constituted of a thermosetting material, it therefore possesses great chemical stability, which is an asset in the case of installation in zones subjected to different aggressive chemical agents as is the case in an airplane turbojet. Finally, the porous nature of the material causes a reduction of mass of the acoustic coating and therefore a reduction in cost, particularly by a reduction in energy consumption and an increase in useful load.

The sacrificial material is advantageously an organic ink or a natural wax which must be formable by rapidly printing with small filament cross section diameters or widths (typically less than 250 microns), the removal of which must simple and at a temperature that does not degrade the thermosetting material. A material including a Prussian blue paste such as Loctite™ or a two-component material formed from a microcrystalline wax (type SP18) and a low molecular weight petroleum derivative such as Vaseline™ is preferred.

The thermosetting material must have absorbent behavior and in particular good infiltration capacity (low viscosity) to impregnate perfectly, typically by gravity, the scaffold while respecting its geometry, and sufficient mechanical strength to support the elimination of the sacrificial material without degradation. It must also be only slightly exothermic so that the heat released during its solidification does not cause the sacrificial material to melt. A material based on polymer resin such as epoxy, or a photo-polymerizing resin, the latter allowing samples of larger dimensions to be obtained, is therefore completely suitable.

The invention claimed is:

1. A manufacturing method of an acoustic coating in an ordered array of interconnected micro-channels intended to receive, on a reception surface, an incident acoustic wave with a direction normal to the reception surface, the method comprising:
    depositing a sacrificial material on a substrate surface to form a three-dimensional scaffold of filaments,
    infiltrating at least one part of said three-dimensional scaffold with a thermosetting material,
    solidifying said thermosetting material to form a solidified material, and removing said sacrificial material from said solidified material to form said ordered array of interconnected micro-channels, wherein, to confer acoustic properties to said ordered array of interconnected micro-channels and form said acoustic coating, said filaments forming by superimposed layers said three-dimensional scaffold are, for a given layer of filaments, oriented in a direction forming, in a plane formed by said layer, a first predetermined angle relative to the direction of said incident acoustic wave, and wherein a diameter or a cross-section width of the filaments is less than 250 microns.

2. The manufacturing method according to claim 1, wherein said filaments have a different diameter or cross-section width depending on the orientation direction of said filaments in said three-dimensional scaffold.

3. The manufacturing method according to claim 1, wherein said superimposed layers forming said three-dimensional scaffold include filaments oriented, for some, according to the first predetermined angle and, for others, according to a second angle being a negative value of the first predetermined angle, a layer of filaments oriented according to the first predetermined angle following a layer of filaments oriented according to said second angle.

4. The manufacturing method according to claim 1, wherein said first predetermined angle is comprised between 25° and 40.

5. The manufacturing method according to claim 1, wherein the fill rate of said three-dimensional scaffold is at least 70%.

6. The manufacturing method according to claim 1, wherein said sacrificial material is an organic ink or a natural wax.

7. The manufacturing method according to claim 1, wherein said thermosetting material is a polymer resin.

8. The manufacturing method according to claim 7, wherein said polymer resin is a photo-polymerizing resin.

\* \* \* \* \*